Patented May 6, 1952

2,595,459

UNITED STATES PATENT OFFICE 2,595,459

RECOVERY OF PROTEIN FROM WHEY

Maurice E. Hull, La Grange, Ill., assignor to Armour and Company, Chicago, Ill., a corporation of Illinois No Drawing. Application February 16, 1950, Serial No. 144,573

4 Claims. (Cl. 260—122)

This invention relates to the recovery of protein from whey.

Various processes have heretofore been employed for the recovery of lactalbumin from whey. Such processes have been unsatisfactory because of the precipitation, little by little, of flocculent curd as the whey is heated or otherwise treated. The flocculent curd material is difficult to remove and the process is relatively long and expensive.

Those experienced in the art know about the difficulty of obtaining a protein coagulation from whey that can be handled readily without the time-consuming period required to promote sufficient settling before decantation or separation can be initiated. The protein particles are so light and flocculent that the convection currents found in the hot liquid during the cooling down period carry these protein particles throughout the liquid. When the major portion of the protein settles to the bottom of the vat, considerable amounts of protein are visibly siphoned off with the whey effluent.

An object of this invention is to provide a process in which the whey proteins may be caused to rise to the surface where they coalesce into a thick mass that can be removed readily by shoveling, forking or dipping, etc., leaving a clear whey to be drawn off and utilized with a minimum of interference from floating curd particles. A further object is to provide an improved method of separating protein materials from whey while obtaining a whey product substantially free of such proteins. A further object is to provide a process for the neutralization of whey and the heating thereof to selected temperatures, after which, by a change in pH, the protein of the whey is segregated and readily removed from the whey. Other specific objects and advantages will appear as the specification proceeds.

In one embodiment of the invention, the whey, which may be sweet or sour, is treated with an alkali to bring the pH thereof to about neutral, or slightly above, and then heating the material to a temperature of 180° to 212° F. The pH is then adjusted downwardly to about 4.1 to 4.5 to cause the proteins to rise to the surface of the hot liquid. Here the proteins coalesce into a thick mass which is readily removed so as to leave a clear whey therebelow. Apparently the whey contains carbonates and the addition of acid under the circumstances described above frees $CO_2$ which becomes affected in carrying the curd to the top and bringing about its coalescence there.

The whey may be drawn off below the segregated or coalesced proteins; however, I prefer to first remove the proteins by skimming, forking, shoveling, pumping, etc. so that a clear whey may then be drawn off and utilized with a minimum of interference from floating curd particles.

The curd or protein material removed from the top of the hot liquid may be filtered through filter cloths and thus drained of surplus liquid. If desired, filter bags of filter flannel may be employed and the curd may be pumped into the bags. After standing overnight the bags can be removed and the curd may be pressed in a cheese press. The process gives a yield in excess of 1.5 to 2% of the original whey.

The whey may be neutralized with any suitable alkali. I prefer to employ sodium hydroxide or potassium hydroxide because of the unusually good results obtained by their use. However, if desired, other alkaline agents such as $NH_4OH$, soluble bicarbonate, carbonates or soluble alkaline phosphates may be used. I prefer to employ an alkali of low salt content, but it will be understood that any suitable alkali useful for bringing the material to the desired pH may be used. I prefer to adjust the pH to from 7 to 8.

The temperature in the heating step may range from 180° to 212° F. Excellent results are obtained at a temperature of about 200° F.

Any suitable acid for bringing the pH down to about 4.1–4.5 may be used. I prefer to employ hydrochloric acid. Acetic, phosphoric, sulfuric, and edible, water-soluble organic acids are satisfactory. If the final product is to be used as a food, the only requirement of the acid is that it be non-injurious to the product as a food. If the product is not used as a food, any acid which is effective for adjusting the pH to the range indicated may be used.

The whey can be heated very effectively with steam jets which, in addition to heating the material, provide the necessary agitation during neutralization and acidification. I prefer to employ a steam line that is large enough to heat the whey to 200° F. in about 30 minutes.

In acidifying the whey with concentrated hydrochloric acid, I prefer to determine the pH by removing a sample of the hot whey, cooling it and determining the pH either by known tests or by visual inspection. Visual inspection of the degree of protein coagulation can be used as a guide after some experience. If the whey is neutralized to a definite pH or acidity and the volume of whey is made constant, then the amount of hydrochloric acid needed for coagulation should be the same from one batch to another. In fact, it is possible that after the process has once been satisfactorily operated, there will be little need for any other method of controlling the amount of caustic or acid than that of using the milk acidity test. Roughly, the amount of concentrated hydrochloric acid needed for coagulating 15,000 lbs. of whey at 0.04% acidity is 4.5 gallons or about 45 lbs.

In the step of neutralization of the whey, it was found that the acidity of the whey (milk acidity test) could vary from 0.06% to 0% (neutral point). Higher alkalinities than these could no doubt be used satisfactorily, except that it would require more acid to neutralize these higher alkalinities with its consequent increase in salt content of the whey and whey protein. The above range in acidities corresponds to the pH range of from 7.0 to 8.3. Best results have been obtained when the acidity of the whey is about .04% (7.3 pH).

By bringing the pH down to about 4.1–4.5, it is found that the proteins rise rapidly to the surface of the hot liquid and coalesce in an unusual manner to form a united mass that can be easily lifted from the liquid body. Thus the clear whey left can be drawn off and there are no ill effects due to convection currents upon the protein material because it has already been removed from the liquid body.

By maintaining the pH between 7.0 and 8.0, the whey protein is kept in solution during the heating. The heating within the range of 180° to 212° F. is effective in changing the character of the material so that upon the lowering of the pH to the range of 4.1–4.5, the protein material rising to the top of the liquid body coalesces into an unusually firm curd mass.

While in the foregoing specification I have set forth specific steps in considerable detail, it will be understood that such details may be varied widely by those skilled in the art without departing from the spirit of my invention.

I claim:

1. In a process for recovering protein from whey, the steps of adjusting the pH of the whey to an acidity of 0.06 to 0.0%, heating the whey to about 180° to 212° F., agitating the mixture, and adjusting the pH to about 4.1–4.5 to coalesce the protein, and separating the whey from the protein.

2. In a process for recovering protein from whey, the steps of adjusting the pH to an acidity of 0.04%, heating the whey to about 180° to 212° F., adjusting the pH to about 4.1–4.5 and agitating the mixture to cause the protein to rise and coalesce upon the top of the whey, removing the coalesced protein, and drawing off the liquid whey.

3. In a process for recovering protein from whey, the steps of adjusting the pH with sodium hydroxide to an acidity of 0.06 to 0.0%, heating the whey to about 180° to 212° F., agitating the mixture, and adjusting the pH to 4.1–4.5

4. In a process for recovering protein from whey, the steps of adjusting the pH of the whey to an acidity of 0.06 to 0.0%, heating the whey to about 180° to 212° F., adding hydrochloric acid to lower the pH to 4.1–4.5 and agitating the mixture to cause the protein to rise to the surface of the liquid whey, removing the protein from the top of the whey, and withdrawing the whey.

MAURICE E. HULL.

REFERENCES CITED

The following references are of record in the file of this patent:

UNITED STATES PATENTS

| Number | Name | Date |
|---|---|---|
| 2,494,148 | Truce | Jan. 10, 1950 |
| 2,497,420 | Scott et al. | Feb. 14, 1950 |